United States Patent [19] [11] Patent Number: 4,830,692
Art et al. [45] Date of Patent: May 16, 1989

[54] METHOD AND DEVICE FOR AUTOMATIC ASSEMBLY OF LAMINATED PANES

[75] Inventors: Andreé Art, Lonzee; Jean-Claude Jandrain, Warnant Anhee; Jean Lecourt, Waterloo; Désiré Legros, Jemeppe Sur Sambre, all of Belgium

[73] Assignee: Saint-Gobain Vitrage, Courbevoie, France

[21] Appl. No.: 127,463

[22] Filed: Dec. 2, 1987

[30] Foreign Application Priority Data

Dec. 2, 1986 [FR] France ............................. 86 16792

[51] Int. Cl.$^4$ ........................................... B32B 31/04
[52] U.S. Cl. ........................................ 156/64; 156/99; 156/356; 156/357; 156/556; 198/380; 198/394
[58] Field of Search .................. 156/64, 99, 356, 357, 156/556; 198/380, 394; 271/184, 225, 226, 227

[56] References Cited

U.S. PATENT DOCUMENTS 4,445,679 5/1984 Bay ................................. 198/394 X

Primary Examiner—Robert A. Dawson
Attorney, Agent, or Firm—Oblon, Fisher, Spivak, McClelland & Maier

[57] ABSTRACT

The invention relates to a method and apparatus for automatic assembly of laminated panes formed of at least one rigid sheet and at least one flexible sheet. According to the method of the invention, the flexible sheet is positioned by gravity according to at least one of two coordinates in the horizontal plane determining an intermediate position for gripping and is then transferred through a path of constant length to a stacking station for the elements of the laminated pane.

16 Claims, 5 Drawing Sheets

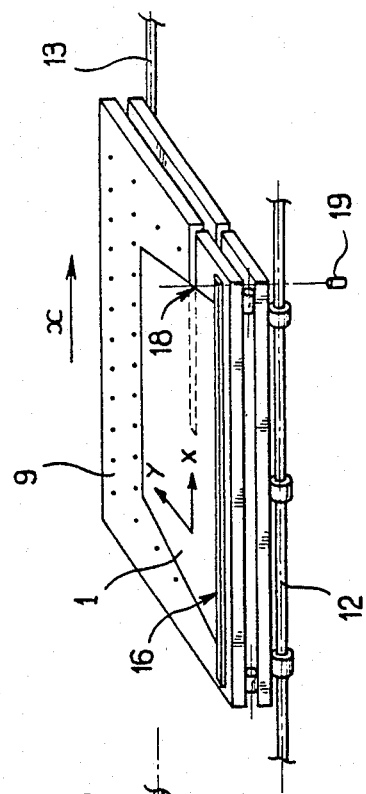
FIG_3
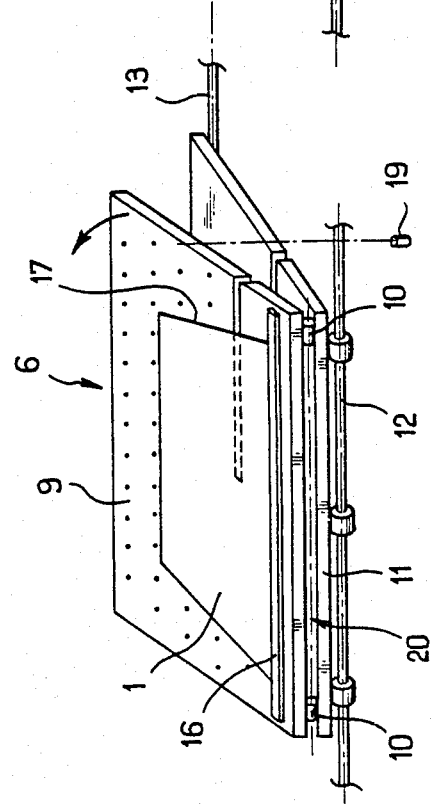
FIG_2

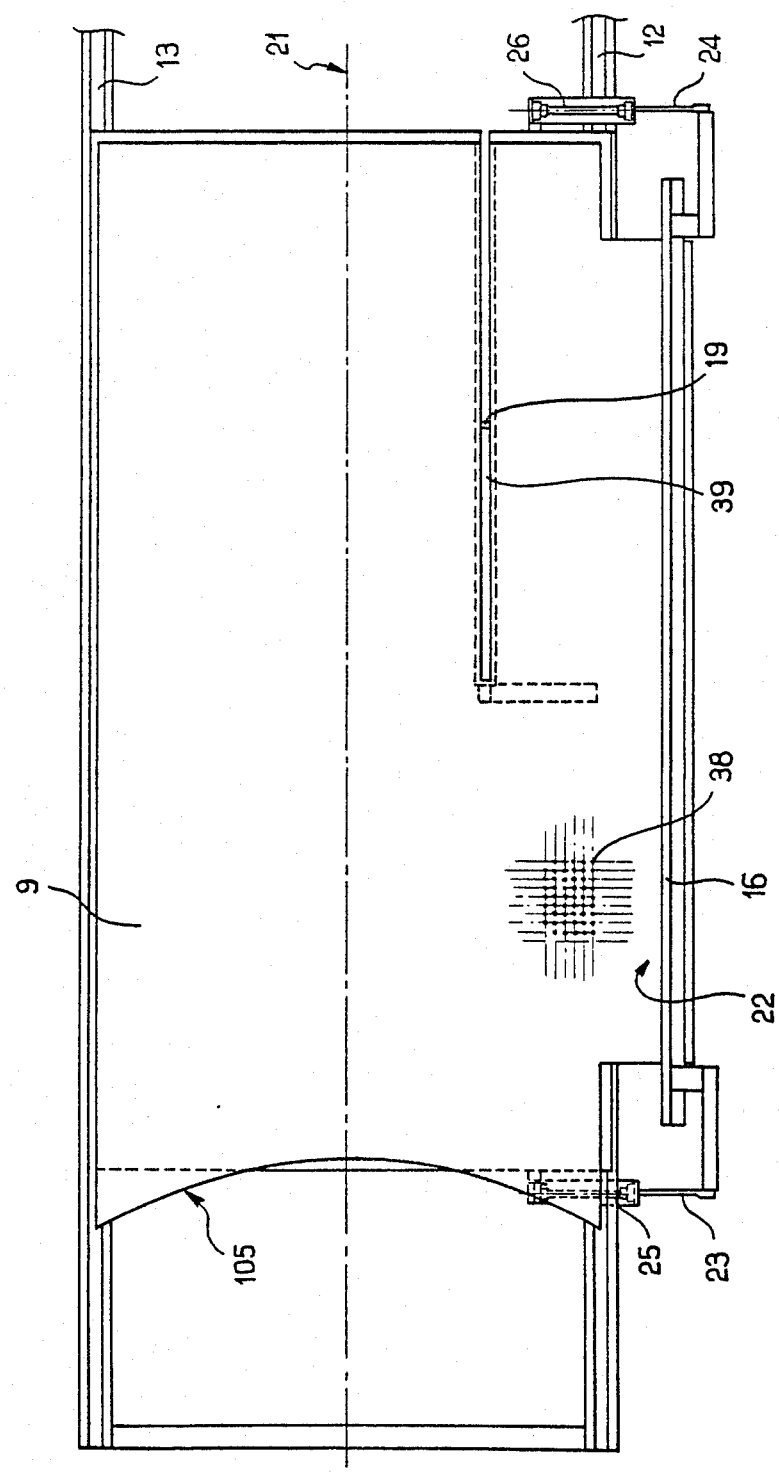
FIG_4

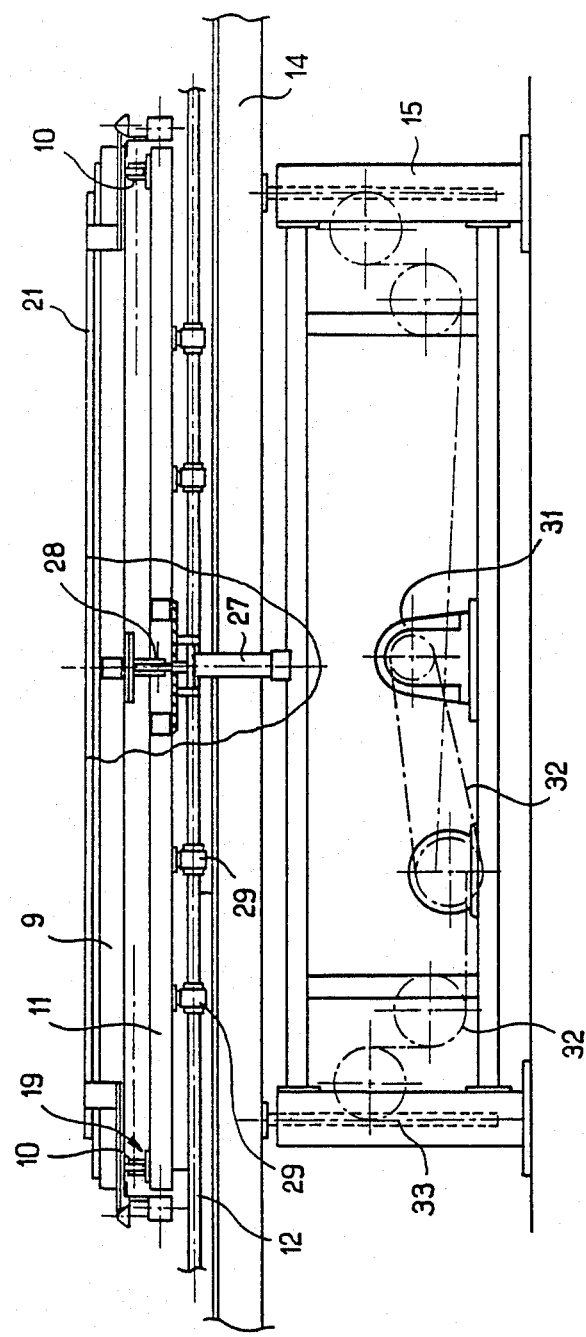
FIG_5

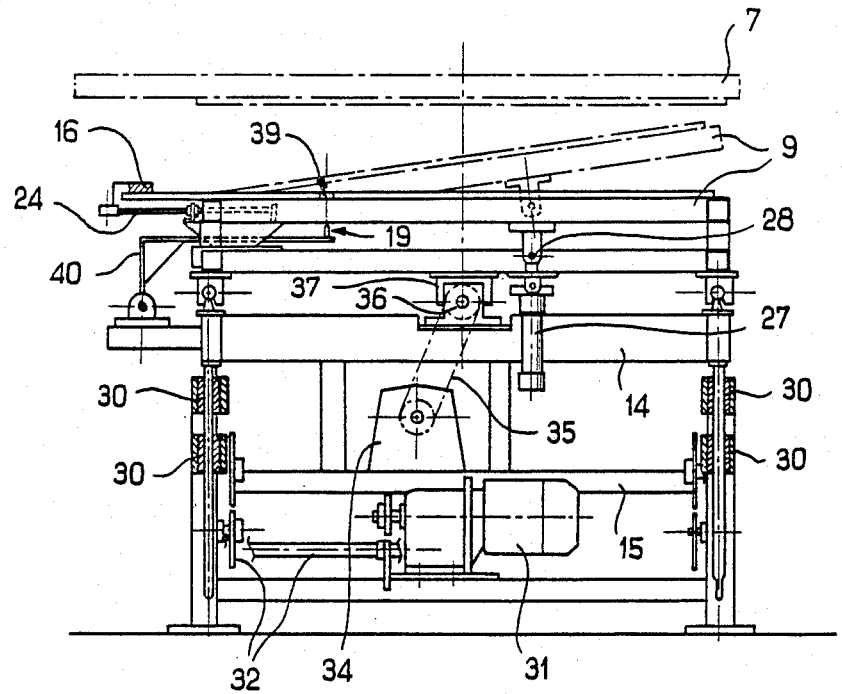
FIG_6

METHOD AND DEVICE FOR AUTOMATIC ASSEMBLY OF LAMINATED PANES

BACKGROUND OF THE INVENTION

1. Field of the Invention

The present invention relates to automatic manufacture of stratified structures such as laminated panes.

2. Discussion of the Related Art

Laminated panes used in buildings and transport vehicles, notably as a windscreen, are generally formed of at least one rigid sheet such as a sheet of glass or a sheet of plastic material such as polycarbonate or polymethylacrylate, and at least one sheet of flexible plastic material, of polyvinylbutyral or polyurethane for example, generally used as an intermediate sheet in the case of a structure comprising two rigid sheets.

To make these laminated panes, the sheet or sheets of flexible plastic material are cut initially to the exact shape of the pane or generally to a geometrical shape which is slightly larger and generally described as a blank, and they are stacked with the other elements forming the laminated pane. All of these elements are assembled together by means of an assembly operation which is generally carried out in two stages: the first stage consists for example, of a calendering operation effecting preliminary assembly, followed by a second stage consisting of an autoclave cycle using a high temperature and pressure for producing the final assembly.

The invention relates more particularly to stacking of the flexible sheet with the other elements forming the laminated pane, and the operations associated with it, notably its initial centering in an intermediate position adjacent the stacking station, its transfer to the stacking station and its deposition in the correct position in the stack.

One of the problems encountered in automation of the different operations used for manufacturing laminated panes is the correct positioning in the stack to form the pane.

One solution which has already been suggested consists of precisely arranging the sheets of plastic material one on the other at a fixed and predetermined position called a storage station. In this case the sheet is gripped at that location and it is transferred by a path of constant length to the stacking station for the laminated pane. Unfortunately, sheets of plastic material of polyvinylbutyral or polyurethane have at the temperatures encountered in assembly plants a certain tendency to adhere to each other and it is found that at the moment of gripping the upper sheet of the pile the sheet immediately below is also seized temporarily as it is more or less adhered, and it may be displaced from its correct gripping position. The resulting displacement of the sheet is then transferred to the stacking station and the stacking will not be correct.

SUMMARY OF THE INVENTION

The invention provides a method of automatic assembly of a laminated pane in which the position of each of the flexible sheets in an intermediate position is controlled separately and eliminates any risk of displacement of one sheet relative to the others.

According to the invention, the flexible sheet is brought to the stacking from a horizontal fixed gripping position, by transfer through a predetermined path, the flexible sheet being first positioned by gravity in at least one of two coordinates of a horizontal plane which determines the gripping position. Accordingly to a characteristic of the method, the flexible sheet is positioned at the chosen coordinate by contact against a longitudinal rule, itself arranged in a predetermined position. The positioning of the flexible sheet according to the other coordinate of the plane of its centering may be carried out by longitudinal displacement and passage in front of a detector.

In order to facilitate the positioning operations, that is to say convergence at the desired intermediate position, the sheet of plastic material is advantageously supported by an air cushion during the operation of positioning by gravity.

The individual positioning, that is to say the convergence, of each of the sheets of flexible plastic material in a predetermined intermediate position has a number of advantages. It does not require a precise stacking of the blanks at a gripping station, and it avoids any problem of adhesion of the sheets to each other. Also, the individual convergence allows differences in orientation of the sheets supplied by the feed conveyor.

This individual convergence may further be applied to a blank obtained directly after its cutting from a roll, without intermediate storage of the blanks. It is applicable to all the types of polyvinylbutyral which have a greater or lesser rigidity.

The invention also relates to a device for carrying out the method. The device for automatic assembly according to the invention comprises centering means for the rigid sheets such as glass sheets, these means being arranged at a stacking station for the pane, means for centering or converging onto an intermediate position for the sheet of flexible plastic material, these means comprising a tilting table provided with a rule arranged along one of two coordinates determining the intermediate position, generally parallel to the axis of tilting of the table, means for transfer of the sheet of flexible plastic material from its intermediate centered position to the stacking station for the pane, a conveyor bringing the rigid sheets to the stacking station, and an associated conveyor bringing the flexible sheets to the table for intermediate centering.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIGS. 2 and 3 show schematically the stages of centering of the blank in its intermediate position;

FIG. 4 shows a view from above of a centering table;

FIG. 5 is a view in elevation of the centering table of FIG. 4; and

FIG. 6 is a side view of the table shown in FIG. 5.

DETAILED DESCRIPTION OF THE PREFERRED EMBODIMENT

Figure 1:
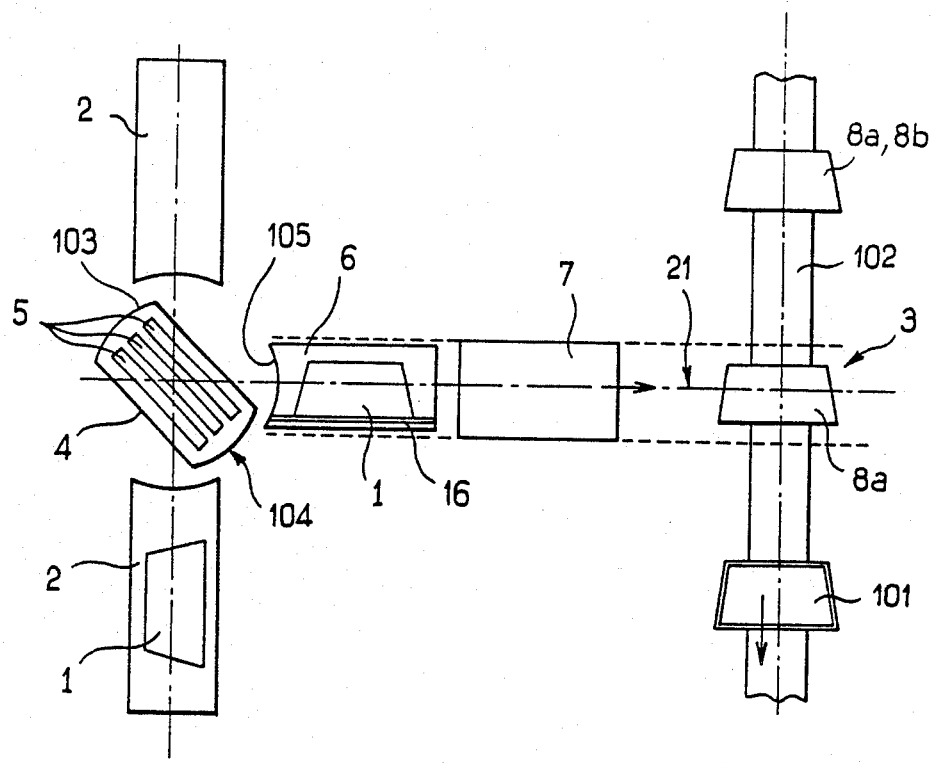
FIG. 1 shows schematically the transfer line for a blank between a supply conveyor and a stacking station with passage on a centering table for centering of the blank in an intermediate position.

FIG. 1 shows the transfer line for the blank 1 between a double supply conveyor 2 and the stacking station 3 for the elements forming the laminated pane 101 to be made. The stacking station 3 is in the line of feed conveyor 102 for the glass sheets 8a, 8b, this line being called the assembly line, and is perpendicular to the line for transfer of the blank. The supply conveyor 2 which also extends perpendicular to the transfer line brings the blank 1 of trapezoidal shape oriented after cutting, with its trapezoidal bases arranged substantially parallel to the axis of the conveyor 2, to a table 4 for pivoting. Table 4 pivots the blank by 90° in the desired direction according to the initial orientation of the blank on the conveyor 2 so that the larger base of the trapezium is always on the same side relative to the centering table 6. The pivoting table 4 is provided with driving means 5, for example transport belts which transport the blank from the supply conveyor 2 to the table for centering or convergence 6. The transfer movement from the pivoting table 4 to the centering table 6 is facilitated by an air cushion with which the centering table 6 is provided as explained in greater detail below. The sides 103, 104 of the pivoting table 4 are cut to convex arcs of a circle whereas the facing side 105 of the centering table 6 is cut according to a concave arc of a circle, so as to permit rotation of the pivoting table 4 without having to displace the centering table 6.

Having arrived on the centering table 6, the blank 1 is centered according to two centering coordinates predetermined relative to two perpendicular axes X, Y as shown in FIGS. 2 and 3. After being centered in the intermediate position, the blank is gripped from above by a transfer gripper 7 which transfers it to the stacking station 3 by a displacement along a constant path, where it is deposited on the lower glass sheet 8a which is already at the station.

FIGS. 2 and 3 show schematically the centering of the blank on the centering table 6 according to the two coordinates of the predetermined intermediate position relative to axes X and Y. The centering table 6 comprises an upper plate 9 tilting about hinges 10 arranged longitudinally on a lower plate 11 which slides on rails 12, 13 carried as shown in FIGS. 4, 5, 6 by an elevator structure 14, itself sliding vertically on a framework 15. The positioning according to coordinate Y is carried out by tilting the upper plate 9 which causes contact, due to gravity, of the base of blank 1 against a rule 16 mounted on the tilting plate. Positioning according to coordinate X is carried out by displacement shown schematically by arrow X of the two plates 9, 11 along rails 12, 13 until the edge of the inclined slide 17 of the trapezium intercepts the axis 18 of a detector 19, for example an optical detector such as a photo-cell arranged below the plate 11.

FIGS. 4, 5 and 6 show a centering table 6 of the device according to the invention. As described above, the table 6 comprises an upper tilting plate 9 mounted to pivot on hinges 10 fixed along a longitudinal side of a lower plate 11, such that the upper plate 9 may tilt about a horizontal axis 20 parallel to the axis 21 of the transfer line.

A rule 16 parallel to axis 21 makes contact with the surface 22 of the tilting plate 9. The two ends of the rule are fixed to stems 23, 24 of the two horizontal jacks 25, 26 carried by the elevator structure 14, perpendicular to the axis of table 6 which is coincident with the axis 21 of the transfer line. These two jacks 25, 26 are capable of separating the rule 16 from plate 9 relative to the axis of the table in order to facilitate later gripping of the blank 1 after positioning by the transfer gripper 7.

The position of the rule on the plate may as required be modified for other types of blanks. The tilting movement of the tilting plate is caused by jack 27 having a tilting coupling 28 and carried by the lower plate 11. This lower plate 11 is mounted to slide by means of bearings 29 on rails 12, 13 supported by the elevator structure 14, itself mounted to slide vertically, by means of racks 33 fitted in bearings 30 of the framework 15. The upper position of the elevator structure 14 supporting the table 6 is used for gripping of the blank 1 on the table 6 by the transfer of gripper 7 whereas the lower position is used for centering of the blank.

The up and down movement of the elevator structure 14 is controlled by an electric motor 31 and a transmission system 32 comprising chains, toothed wheels and the vertical racks 33 integral with the elevator structure 14. Movement of the table 6 along a longitudinal displacement along rails 12, 13 is controlled by an electric motor 34 and a transmission system 35 which actuates rotation of a screw 36, which causes driving of a nut 37 integral with table 6.

The tilting plate 9 is pierced with orifices 38 connected to means (not shown) which may alternately create an air cushion by blowing air or an aspiration, according to the different phases of centering as explained in the following. The tilting plate 9 of table 6 has a slot 39 which extends longitudinally over approximately half of the length of the table. An optical detector 19 mounted by means of an arm 40 on the framework 15 below the table, in the vertical plane of the slot 39, may thus locate passage of the side 17 of the blank in order to position it according to the second coordinate for centering.

The side 105 of the centering table 6 facing the pivoting table is cut according to a concave arc of circle corresponding to the cross-section of the sides of the pivoting table, which allows pivoting of the pivoting table without having to displace the centering table for this purpose.

The device operates in the following manner.

A blank 1, of trapezoidal shape, is brought by the supply conveyor 2 to the pivoting table 4. The orientation of the blank on the conveyor is such that the two bases of the trapezium are substantially parallel to the axis of conveyor 2. When it is on the pivoting table 4, the latter pivots in the direction allowing the larger base of the trapezium to be presented facing the rule 16 when the blank arrives on the centering table 6. The transport belts 5 with which the surface of the pivoting table is equipped move the blank into the centering table 6. The movement of passage from the pivoting table 4 to the centering table 6 is aided by the air cushion created by blowing air through orifices 38 with which the upper plate 9 of the table 6 is provided. When the blank is on the centering table 6, the upper plate is then tilted by the action of jack 27 about hinges 10. The blank is thus gravitationally moved to provide contact of its larger base against rule 16 arranged on the plate 9 in the position desired, parallel to the axis of the line of transfer and in the desired coordinate relative to axis Y.

Blowing of air creating the air cushion is interrupted and it is replaced by aspiration provided by the same orifices 38 of the tilting table, which holds the blank on the plate 9 in its centering coordinate relative to axis Y. The plate 9 then returns to its horizontal position and the assembly is moved by displacement of table 6 along the rails 12, 13 according to the axis 21 of the line of transfer until passage of the inclined side 17 of the blank past the vertical optical axis 18 of the optical detector 19 is detected, at which time the position corresponds to the desired coordinate relative to axis X.

The blank is then in the intermediate centered position also known as the converged position.

The rule 19 is then disengaged from the surface of table 6 towards the side under the action of the two jacks 25, 26.

The table 6 is then lifted by the action of the electric motor 31 on the transmission system 32 with toothed wheels and racks while the transfer gripper 7 moves to a position above it. Aspiration of the plate 9 on table 6 is discontinued and is replaced by blowing of air, whereas the transfer gripper 7 exercises an aspiration. By aspiration from transfer gripper 7 and blowing from plate 9 the blank 1 passes from the upper plate 9 of table 6 to the transfer gripper 7.

The lower surface of the transfer gripper 7 is advantageously divided into a plurality of sections, for example five sections, which are controllable and adjustable separately for aspiration and blowing so as to facilitate the later deposition of the blank.

The transfer gripper 7 then moves the blank 1 by a displacement through a constant path of travel to the stacking station 3 where the lower glass sheet 8a is waiting in a horizontal position, the glass sheet 8b being held outside the space traversed by the transfer gripper 7. Aspiration of the transfer gripper 7 is then stopped and the blank falls onto the glass sheet 8a into the exact position for stacking. In order to assist deposition of the blank 1 the transfer gripper 7 exercises a blowing, advantageously localized in the center of the blank 1. In order to further improve deposition of the blank on the glass sheet it may be provided with retractable fingers which are not shown, arranged at predetermined positions on the lower surface of the transfer gripper 7, for example arranged on the axis of symmetry of said surface, which temporarily hold the blank deposited on the glass sheet, and which in the rest position are retractable within the transfer gripper 7.

After movement of the transfer gripper 7 out of the stacking station, the upper glass sheet 8b is deposited on the blank in order to complete stacking to form the laminated pane 101 which may then be transported to a following station.

During deposition of the blank in the stack the following blank is brought by the conveyor and then centered on the centering table 6.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of assembly of laminated panes formed of at least one rigid glass sheet and at least one flexible sheet, comprising the steps of:
   using gravity to position the flexible sheet according to at least one coordinate of a plane;
   fixing said flexible sheet in a horizontal gripping position on said plane;
   transferring said fixed flexible sheet along a predetermined constant path to a stacking station having a rigid sheet thereon;
   stacking said rigid and flexible sheets in said stacking station; and
   unifying said stacked sheets to form a laminated pane.

2. The method of claim 1, wherein said flexible sheet is trapezoidal and said step of using gravity to position said flexible sheet comprises:
   positioning a longitudinal rule on said plane; and
   tilting said plane about a horizontal axis parallel with said rule until a base of said flexible sheet moves into contact with said rule.

3. The method of claim 2, wherein said rule is positioned to extend parallel to another coordinate of said plane.

4. The method of claim 2 including the step of using positive fluid pressure between said flexible sheet and said plane to aid movement of said flexible sheet into contact with said rule.

5. The method of claim 1, wherein said fixing step comprises:
   horizontally orienting said plane; and
   moving said plane in a direction parallel to another coordinate of said plane to said gripping position.

6. The method of claim 2, wherein said fixing step comprises:
   horizontally orienting said plane; and
   moving said plane in a direction parallel to another coordinate of said plane to said gripping position.

7. The method of claim 5, including the step of using a detector to detect movement of said plane to said gripping position.

8. The method of claim 8, including the step of using a detector to detect movement of said plane to said gripping position.

9. An assembly device for laminated panes formed of at least one rigid sheet and at least one trapezoidal flexible sheet, comprising:
   means for introducing and centering a rigid sheet in a stacking station;
   means for centering a flexible sheet at an intermediate position, comprising:
      (a) a planar tilting table tiltable about a horizontal axis parallel to a coordinate of the plane of said tilting table,
      (b) a longitudinal rule positioned on said tilting table and extending along said coordinate,
      (c) means for tilting said tilting table about said horizontal axis, whereby a flexible sheet positioned thereon is moved into contact with said rule, and
      (d) means for moving said tilting table along said coordinate until said flexible sheet contacting said rule is centered at said intermediate position;
   means for transferring said centered flexible sheet from said intermediate position to said stacking station and for stacking said rigid and flexible sheets; and
   means for bringing flexible sheets to said tilting table.

10. The assembly device of claim 9 wherein said tilting table comprises a lower plate movable along said coordinate and an upper plate tiltably mounted on said lower plate by hinges.

11. The assembly device of claim 10 including orifice means for supplying positive or negative fluid pressure to a top surface of said upper plate.

12. The assembly device of claim 9 including means for vertically moving tilting table.

13. The assembly device of claim 11 including means for vertically moving tilting table.

14. The assembly device of claim 9 wherein said transferring means comprise:

a transfer gripper having on a lower surface thereof orifice means for supplying positive or negative fluid pressure to said lower surface; and means for moving said gripper to a position over said tilting table, whereby a flexible sheet may be transferred to said transfer gripper via fluid pressure.

15. The assembly device of claim 14 wherein said lower surface of said transfer gripper is divided into sections, wherein said means for supplying fluid pressure to said lower surface comprises means for independently supplying fluid pressure to each of said sections.

16. The assembly device of claim 9 wherein said means for bringing flexible sheets to said tilting table comprises a pivoting table.

* * * * *